United States Patent [19]

Brennan

[11] 4,238,092
[45] Dec. 9, 1980

[54] ACCESSORY FOR A TURBINE ENGINE

[75] Inventor: John M. Brennan, Chula Vista, Calif.

[73] Assignee: Rohr Industries, Inc., Chula Vista, Calif.

[21] Appl. No.: 934,660

[22] Filed: Aug. 17, 1978

Related U.S. Application Data

[63] Continuation of Ser. No. 815,690, Jul. 17, 1977, abandoned.

[51] Int. Cl.$^2$ ............................................. B64D 29/06
[52] U.S. Cl. ........................................ 244/54; 248/554
[58] Field of Search ...................... 244/54, 53 R, 7 R; 181/213; 239/265.11, 265.19, 504, 518; 60/226 R, 271, 266; 248/554, 555

[56] References Cited

U.S. PATENT DOCUMENTS

| | | | |
|---|---|---|---|
| 3,027,713 | 4/1962 | Tyler et al. | 239/265.11 |
| 3,423,048 | 1/1969 | Clarke et al. | 244/7 R |
| 3,799,476 | 3/1974 | Bouiller et al. | 244/54 |
| 4,044,555 | 8/1977 | McLoughlin et al. | 60/271 |

FOREIGN PATENT DOCUMENTS 1417504 12/1975 United Kingdom .................... 60/271

*Primary Examiner*—Barry L. Kelmachter
*Attorney, Agent, or Firm*—Patrick J. Schlesinger; Frank D. Gilliam

[57] ABSTRACT

An accessory for a jet engine for tuning turbine exhaust gases for maximum thrust capabilities in the absence of a turbine thrust reverser and cowling combination normally for and utilized thereon. The accessory comprises an inner streamlined nozzle shell forming a continuation of the outer skin of the turbine exhaust duct, a center mounted engine plug providing a path for the turbine gases between the inner nozzle surface and the engine plug outer surface and a transition adapter for mating and attaching the plug to the center of the engine. The engine plug is further provided with an opening between its engine attached and outer ends providing communication between the engine and the atmosphere adjacent the rear end of the plug. The accessory further comprises a fairing for attachment to the pylon supporting the engine to further tune the gases leaving the nozzle.

2 Claims, 6 Drawing Figures

ACCESSORY FOR A TURBINE ENGINE

This is a continuation of Ser. No. 815,690, filed July 17, 1977 now abandoned.

BACKGROUND OF THE INVENTION

The invention pertains to engine nozzle and plug and more particularly to an engine nozzle, plug and pylon fairing to be utilized on the engine in place of a turbine thrust reverser normally provided therewith.

It is well known that since the original concept of jet engines for aircraft, fan type or otherwise, stopping of the aircraft is a considerable problem due to the operating speeds required both for take off and landings. This problem has increased due to the size and weight of modern aircraft utilizing this type of propulsion. Wheel brakes, fan reverser and thrust reverser have been used both singularly and in various combinations. Safety laws of the United States require that an aircraft be rated for take off and landing distances according to their ability to brake with wheel brakes alone and reversers of both types are normally added only to further increase the safety margin of the aircraft.

Aircraft engines designed to include reversers will not operate efficiently when the reverser units are removed. An example of this type of engine design is the General Electric engine utilized on the Douglas DC-10. aircraft. On this specific aircraft, the turbine thrust reverser provides only 5% to 8% of the aircraft braking capabilities and weighs in excess of 500 pounds each unit. Obviously, an aircraft of this type would have increased performance if the reversers could be physically removed to reduce overall aircraft weight while maintaining or improving the engine's overall efficiency.

Until the emergence of the instant invention, this was not provided for.

SUMMARY OF THE INVENTION

Generally stated the invention pertains to accessories for replacing the turbine thrust reverser of engines designed for their use and yet maintains or improve the overall aircraft efficiency characteristics by a reduction of weight and improved engine thrust gas tuning (defined as minimum resistance to the rearward flow of gasses resulting in maximum thrust).

A contoured nozzle is added to confine the turbine gases and direct them in a more efficient rearward manner. A central engine plug is provided with an outer surface contour that works with the inner surface of the nozzle to tune the thrust gases. The outer surface of the nozzle further provides an inward boundary for the fan gases by providing a low resistance path for the rearward directed engine gases to maximize the engine thrust characteristics, aiding in their overall efficiency. The plug is designed in place thereof to provide communication between the engine and the atmosphere, thus allowing the removal of engine waste. A fairing is provided for pylon mounted engines to further direct the thrust gases rearward in an efficient manner by carefully reducing the scrubbing drag (scrubbing drag defined as the friction created by the moving thrust gases having contact with fixed structure).

The mechanism is simple to construct, requires no service, is lighter in weight than the apparatus it replaces and provides for improved operation of the engine and aircraft with related fuel consumption reduction.

The above and other specific features of the instant invention will be readily apparent as the description continues while being read in conjunction with the appended drawings.

DETAILED DESCRIPTION OF THE PREFERRED EMBODIMENT

Figure 1:
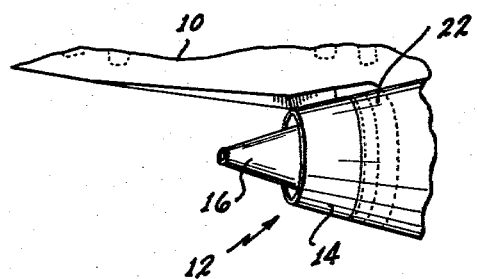
FIG. 1 is a side view of the instant invention installed on an aircraft.

Throughout the drawings and specification, the same reference numerals are used to depict the identical part or element.

Referring now to FIG. 1, a portion of the aircraft engine supporting pylon 10 is shown supporting engine 12. Attached to the engine is a nozzle 14, a center engine plug 16 and a fairing 18 attached to pylon 10.

Figure 2:
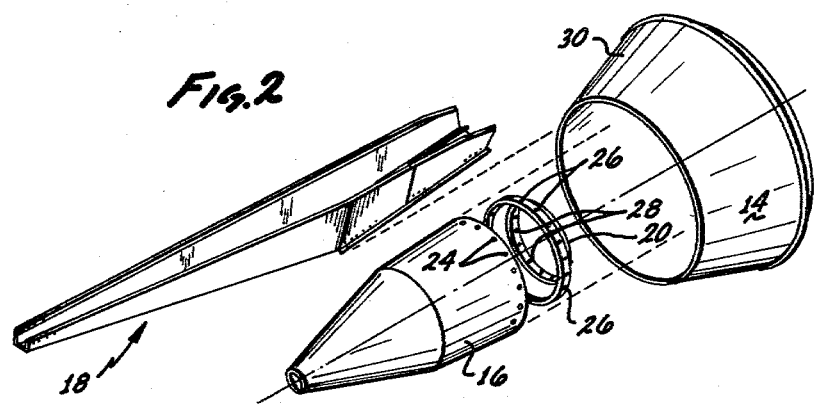
FIG. 2 is an exploded view of the components comprising the instant invention.

Referring now to FIG. 2, an exploded view of the nozzle 14, engine plug 16 having a longitudinal profile resembling two axially aligned abutting frustro conic sections, fairing 18 and a transition adapter 20 used for attaching the plug 16 to the center of the engine 12 is shown. The various shapes of these components shown are designed for use on the DC-10 General Electric engine CF6. It should be noted that other engines may use similar or different configured elements as required to practice this invention.

The nozzle 14 is attached to the turbine thrust nozzle 22, see FIG. 1, in any convenient manner. A typical attachment of the nozzle 14 is shown in FIG. 3 and hereinafter discussed.

The engine plug 16 is attached to the adapter 20 in any conventional manner. Typically a plurality of apertures 24 in the plug mate with an equal number of apertures 26 in the adapter and rivet-bolt-nut configurations or the like, not shown, are passed through the apertures and secured therein. The opposite side of the adapter 20 also has a plurality of apertures 28 which align with apertures 26 at the opposite side. The apertures 28 align with an equal number of apertures on the rear of the engine, not shown, and are secured thereto by any convenient manner such as, but not limited to, cap screws or the like.

Figure 3:
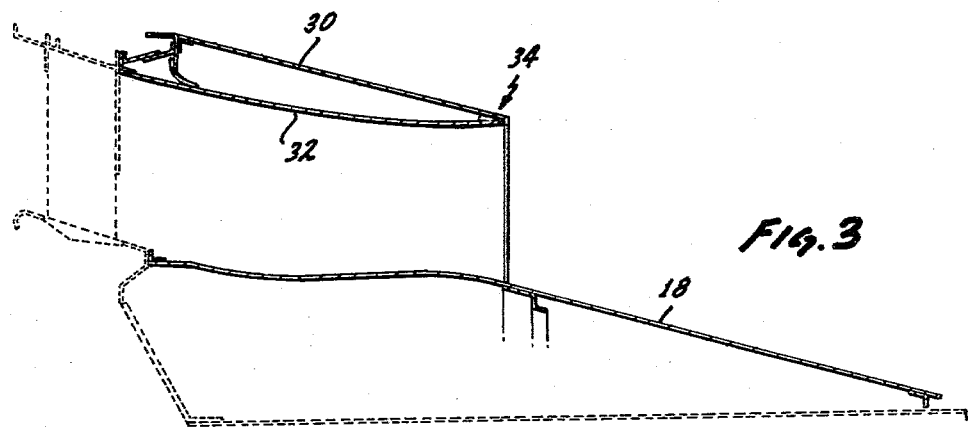
FIG. 3 is a cutaway side view of a portion of the nozzle and engine plug of the instant invention.
Figure 4:
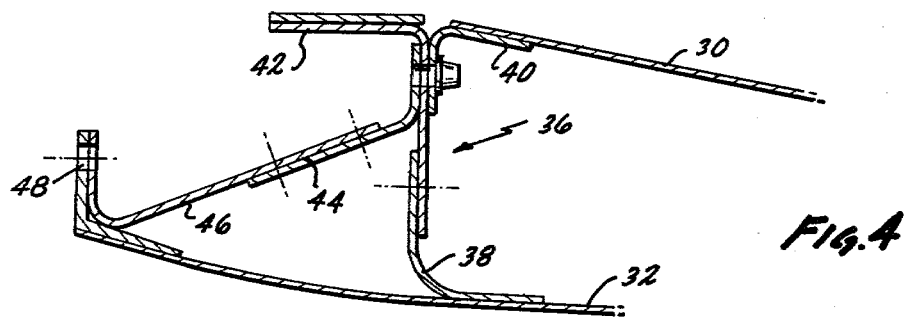
FIG. 4 is a detailed showing of the nozzle attachment hardware.

Referring now to FIG. 3, the nozzle 14 is formed by outer skin 30 and inner skin 32. The skins 30, 32 are joined at their trailing edges 34 by welding or the like. The skin is formed from any suitable material capable of withstanding the extreme heat and the various other conditions to which a turbine thrust nozzle is exposed. The forward edges of the skin are joined together and to the turbine nozzle by a bracket assembly 36, see FIG. 4. The bracket assembly 36 is formed by a plurality of various angled brackets 38, 40, 42, 44 and 46. Bracket 46 is secured to a bracket 48 attached to both the inner surface of skin 32 and the turbine nozzle. The various brackets are secured to each other, to the skin structure or the engine turbine nozzle by rivets shown or any other convenient manner, such as, but not limited to, welds, bolts, or the like.

Figure 5:
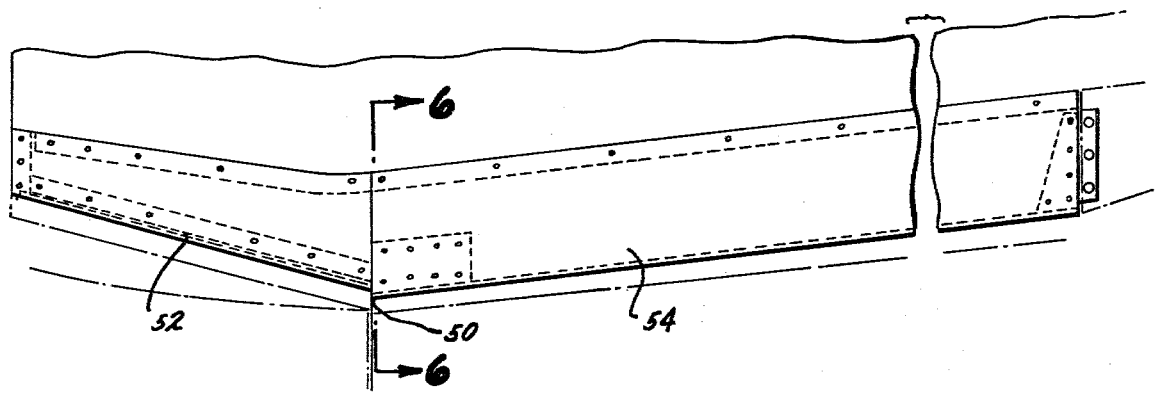
FIG. 5 is a side view of the pylon streamlining fairing of the invention.

Referring now to FIG. 5, a side view of fairing 18 is shown. The fairing angles upward from area 50 forming a short forward section 52. This short section 52 conforms to the outer cowl skin 30. A longer portion 54, like short section 52, angles upward from area 50.

Figure 6:
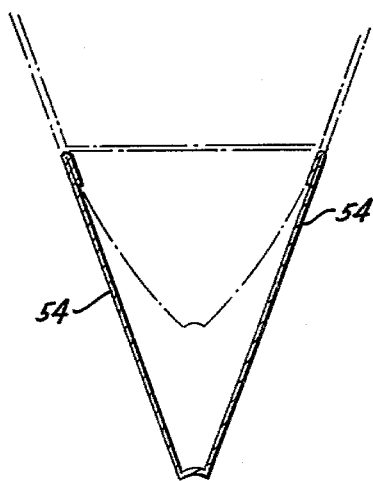
FIG. 6 is a cross section showing of FIG. 5 taken along line 6—6.

Referring now to FIG. 6, the longer portion 54 of fairing 18 has a generally flattened "V" shaped cross-section for splitting and directing the thrust gases from the turbine nozzle cowl 14 in a rearward manner. The gases leaving the cowl 14 are tuned by the combination of the cooperating surface slopes of engine plug 16 and the convex flattened surface of fairing 18. The convex flattened surface is shaped in a manner that conforms with the outer boundary of the exiting gases.

Many changes may be made in details of the instant invention in the method and materials of fabrications, in the configuration and assemblage of the constituent elements without departing from the spirit and scope of the appended claims, which changes are intended to be embraced therewithin.

Having thus described the invention, what is claimed as new and useful and desired to be secured by United States Letters Patent is:

1. A thrust tuning accessory for use with a turbine engine pylon mounted to an aircraft having a turbine exhaust duct utilizing said accessory in the absence of a thrust reverser thereon comprising:
    an outer cowl member having streamlined inner and outer surfaces attached to the outer periphery of the turbine exhaust duct forming a rearward streamlined continuation thereof;
    a hollow open ended engine center plug having an outer surface form defining a thrust gas path with the inner surface of said cowl member, said plug having a longitudinal cross-sectional profile resembling two abutting frustroconic sections, the open end of said engine plug remote from said engine being substantially pointed and extending further rearward than said outer cowl member; and
    a transition means for attaching said engine center plug to said engine, said engine accessory further comprising a fairing element for attachment to said pylon wherein the configuration of the outer surface of said fairing element cooperates with the outer boundary of the engine gas to further tune the gases leaving said engine and wherein said fairing element is substantially "V" shaped in vertical cross-section with the downward extending closed end surface of the "V" being substantially flattened with the side surfaces of the "V" substantially conforming with the outer surface of said pylon and the substantially flattened portion slightly convex with respect to said pylon to substantially match the shape of the outer periphery of the exhaust gases exiting from the nozzle.

2. A thrust tuning accessory for use with a turbine engine pylon mounted to an aircraft having a turbine exhaust duct utilizing said accessory in the absence of a thrust reverser thereon comprising:
    an outer cowl member having streamlined inner and outer surfaces attached to the outer periphery of the turbine exhaust duct forming a rearward streamlined continuation thereof;
    a hollow center plug open at opposite ends to provide a through passageway and having an outer surface form defining a thrust gas path, said plug having a longitudinal cross-sectional profile resembling two axially aligned abutting frustro-conic sections, the end of said engine plug remote from said engine being substantially pointed and extending further rearward than said outer cowl member;
    a transition means for attaching said engine center plug to said engine; and
    a fairing element for attachment to said pylon to further tune the tuned gases leaving said engine, said fairing element is substantially "V" shaped in vertical cross-section with the downward extending closed end of the "V" substantially flattened with the side surfaces of the "V" conforming substantially with the outer surface of said pylon and the substantially flattened portion slightly curved inward in a convex manner with respect to said pylon adjacent surface away from said thrust gas path to substantially match the outer periphery of the exhaust gases exiting from the nozzle.

* * * * *